Patented Oct. 12, 1937

2,095,921

UNITED STATES PATENT OFFICE 2,095,921

AGE RESISTER

Albert M. Clifford, Stow, Ohio, assignor to Wingfoot Corporation, Wilmington, Del., a corporation of Delaware No Drawing. Application February 5, 1932, Serial No. 591,227. Renewed October 20, 1933

11 Claims. (Cl. 18—50)

This invention is predicated upon my discovery that the aromatic nitrosamines may be employed to good advantage as age resisters in the vulcanization of rubber. These materials may be introduced into the mix without materially accelerating the rate of vulcanization when the rubber compound is subjected to the action of heat. They do not disturb the so-called "balance" of the rubber compound and may therefore be introduced into standard formulae without changing the proportions of the accelerators ordinarily employed.

Phenyl $\beta$-naphthyl nitrosamine is an illustrative example of a material which falls within the scope of my invention. It may be prepared by first dissolving one part of phenyl $\beta$-naphthylamine in four parts of glacial acetic acid and twelve parts of alcohol, after which the solution is chilled in an ice bath. Thereafter, 3.25 parts of sodium nitrite, dissolved in a minimum amount of water, are added. Phenyl $\beta$-naphthyl nitrosamine separates out, sometimes as a solid material and at other times as an oil which crystallizes after standing.

In either case, the solid material may be filtered off and purified by recrystallizing it from alcohol or benzene. The purified product consists of a crystalline material having a yellowish color and a melting point of 97 to 98 degrees C. The crystalline character of the product, together with the definite melting point thereof, establishes that a true chemical reaction takes place when phenyl $\beta$-naphthylamine and sodium nitrite are brought together under the conditions described below.

The phenyl $\beta$-naphthyl nitrosamine so obtained may be employed as an antioxidant or age resister in numerous rubber compounds. The following is an example of a formula which gives rise to a product having excellent ageing properties.

| | Parts |
|---|---|
| Extracted rubber | 100 |
| Zinc oxide | 5 |
| Sulfur | 3 |
| Stearic acid | 1.5 |
| Accelerator | 2 |
| Phenyl $\beta$-naphthyl nitrosamine | 1 |

In the practice of the invention, the phenyl $\beta$-naphthyl nitrosamine is introduced into the mix prior to vulcanization, preferably by milling it into the stock. Hexamethylene tetramine, diphenylguanidine, mercaptobenzothiazole or any other accelerator desired is similarly introduced, the organic accelerator and the antioxidant, such as one of the aryl nitrosamines herein mentioned, being preferably comprised in an accelerator composition.

Samples of a material prepared in accordance with the preceding formula have been vulcanized by means of steam heat at 40 pounds pressure for periods of 30, 50 and 70 minutes, respectively. One group of these samples was subjected to physical tests in order to ascertain their elasticity and tensile strength prior to ageing. The results of these tests are indicated in the following table:

| Time of cure Mins. at 40# | Tensile strength | Percent elong. | Load in kgs/cm² at | |
|---|---|---|---|---|
| | | | 500% elong. | 700% elong. |
| 30 | 90 | 920 | 12 | 30 |
| 50 | 134 | 830 | 20 | 62 |
| 70 | 180 | 790 | 29 | 110 |

A second group of samples was subjected to artificial ageing in an oxygen bomb heated to a temperature of 50 degrees C. and to a pressure of 50 pounds per square inch for a period of six days. These samples were weighed both before and after artificial ageing in order to ascertain the percent absorption of oxygen during the test. These samples were subjected to physical tests similar to those conducted upon the unaged samples. The results are indicated in the following table:

| Time of cure Mins. at 40# | Tensile strength | Precent elong. | Load in kgs/cm² at | | Percent weight increase |
|---|---|---|---|---|---|
| | | | 500% elong. | 700% elong. | |
| 30 | 90 | 875 | 14 | 37 | 0.86 |
| 50 | 156 | 795 | 26 | 89 | .02 |
| 70 | 185 | 740 | 38 | 150 | .01 |

It will be observed that the presence of the antioxidant inhibits the absorption of oxygen to a very marked degree even when the samples are exposed to prolonged heating in the bomb. The antioxidant also preserves, to a material extent, the original elasticity and tensile strength of the product. Under similar circumstances, samples containing no antioxidant would be reduced to resinous masses containing twelve percent or more of oxygen and would be devoid of elasticity or appreciable tensile strength.

My invention is obviously not limited to phenyl β-naphthyl nitrosamine, but includes, for example, the nitroso derivatives of β-β'-di-naphthyl amine, α-α'-di-naphthyl amine, phenyl α naphthyl-amine, and α-β-di-naphthylamine, as well as other nitrosamines which may be prepared by methods similar to the one employed in the preparation of phenyl β-naphthyl nitrosamine. Examples of such methods are disclosed in Berichte 20-2622 and Annalen 243-300. Compounds falling within the purview of my invention are phenyl ortho tolyl nitrosamine, ditolyl nitrosamine, phenyl xylyl nitrosamine, dixylyl nitrosamine, phenyl para tolyl nitrosamine, benzyl phenyl nitrosamine, together with their amino, halogen, hydroxy and alkoxy substituted derivatives. Still others are the nitrosamines derived from the terpenylanilines such as pinylaniline and from the hydroxy diphenylamines, such as p-hydroxydiphenyl amine and p-p' dihydroxydiphenylamine; also, piperidine nitrosamine, carbazol nitrosamine, and the nitroso derivatives of diphenyl-p-phenylene diamine and dinaphthyl-p-phenylene diamine, etc.

This application is a continuation in part of my prior application Serial No. 252,677, filed February 7, 1928, for "Antioxidant or age resister".

Although for purposes of illustration I have described in detail only certain phases of my invention, it will be apparent to those skilled in the art that the invention is not limited thereto, but that numerous modifications may be made without departing from the spirit of the invention or from the scope of the appended claims. It is intended that the patent shall cover, by suitable expression in the appended claims, whatever features of patentable novelty reside in the invention.

What I claim is:

1. A method of preserving rubber which comprises incorporating therein a material having the structural formula

in which R is an aromatic group and R₁ is a naphthyl group.

2. A method of preserving rubber which comprises incorporating therein a phenyl naphthyl nitrosamine.

3. A method of preserving rubber which comprises incorporating therein phenyl β-naphthyl nitrosamine.

4. A rubber product that has been vulcanized in the presence of a material having the structural formula

in which R is an aryl group and R₁ is a naphthyl group, said material being substantially a non-accelerator of the rate of vulcanization.

5. A rubber product that has been vulcanized in the presence of a material having the structural formula

in which R is a phenyl group and R₁ is a naphthyl group.

6. A method of preserving rubber which comprises incorporating therein a material having the structural formula

in which R represents a naphthyl nucleus and R₁ a nucleus selected from a class consisting of benzene and naphthalene, said material being substantially a non-accelerator of the rate of vulcanization of the rubber.

7. A rubber product that has been vulcanized in the presence of a material having the structural formula

in which R represents a naphthyl group and R₁ is selected from a group consisting of benzene and naphthalene radicals.

8. An accelerator composition comprising an organic accelerator and an aryl beta naphthyl nitrosamine.

9. An accelerator composition comprising an organic accelerator and phenyl beta naphthyl nitrosamine.

10. An accelerator composition comprising an organic accelerator and a diaryl substituted nitrosamine having at least one naphthyl substituent.

11. The method of inhibiting the degradation ordinarily occuring in and on the surfaces of vulcanized rubber on continued exposure to the action of heat, light, flexing and like deleterious influences which comprises the steps of disseminating throughout the rubber in which degradation is to be inhibited, at the time such rubber is being compounded preparatory to vulcanization, a diaryl nitrosamine in which one of the aryl groups is a naphthyl group and subsequently subjecting the mix to the action of superatmospheric conditions of temperature and pressure to cause vulcanization thereof.

ALBERT M. CLIFFORD.